(12) United States Patent
Uleski

(10) Patent No.: US 6,904,795 B1
(45) Date of Patent: Jun. 14, 2005

(54) SEALED MOUNTING OF TIRE MONITORING ASSEMBLY

(75) Inventor: Michael A. Uleski, Roseville, MI (US)

(73) Assignee: Lear Corporation, Southfield, MI (US)

( * ) Notice: Subject to any disclaimer, the term of this patent is extended or adjusted under 35 U.S.C. 154(b) by 27 days.

(21) Appl. No.: 10/940,836

(22) Filed: Sep. 14, 2004

(51) Int. Cl.$^7$ ............................................ G01M 17/02
(52) U.S. Cl. ...................................................... 73/146
(58) Field of Search .............................. 73/146, 146.2, 73/146.3, 146.5, 146.8; 340/443, 444, 445, 340/446, 447, 448; 152/208, 213 A, 217, 152/218, 221, 225 R

(56) References Cited

U.S. PATENT DOCUMENTS

| | | | |
|---|---|---|---|
| 4,328,494 A | * | 5/1982 | Goodall ................. 340/870.18 |
| 4,783,993 A | | 11/1988 | Lothar et al. |
| 5,181,418 A | | 1/1993 | Bartscher et al. |
| 5,585,554 A | | 12/1996 | Handfield et al. |
| 5,717,135 A | | 2/1998 | Fiorletta et al. |
| 5,741,966 A | * | 4/1998 | Handfield et al. .......... 73/146.5 |
| 6,549,125 B2 | * | 4/2003 | Nigon et al. ................. 340/447 |
| 6,802,349 B2 | * | 10/2004 | Kahlbacher ............. 152/225 R |
| 2003/0005759 A1 | | 1/2003 | Breed et al. |
| 2003/0205090 A1 | | 11/2003 | Jakobsen |
| 2003/0209065 A1 | | 11/2003 | Fonteneau |

* cited by examiner

Primary Examiner—William Oen
(74) Attorney, Agent, or Firm—MacMillan, Sobanski & Todd LLC

(57) ABSTRACT

A tire monitoring assembly is advantageously employed with a wheel and tire assembly having a wheel rim, with the wheel rim including a mounting hole having an anti-rotation feature. The tire monitoring assembly may include a mounting stud having a head and a shank extending from the head, with the head including a flange portion and an anti-rotation portion adapted to operatively engage the anti-rotation feature of the wheel rim, and with the shank including a threaded end spaced from the head. A grommet may be made of an elastomeric material and have an inner sealing portion, an outer sealing portion, spaced from the inner sealing portion, and a main body extending between the inner sealing portion and the outer sealing portion and adapted to be located in the mounting hole, with the outer sealing portion enclosing the flange portion. An assembly housing includes a stud hole for receiving the shank therethrough and a mount adapted for maintaining contact with the wheel rim, and a retainer is employed for engaging a portion of the shank extending through the stud hole to thereby secure the assembly housing to the stud.

20 Claims, 2 Drawing Sheets

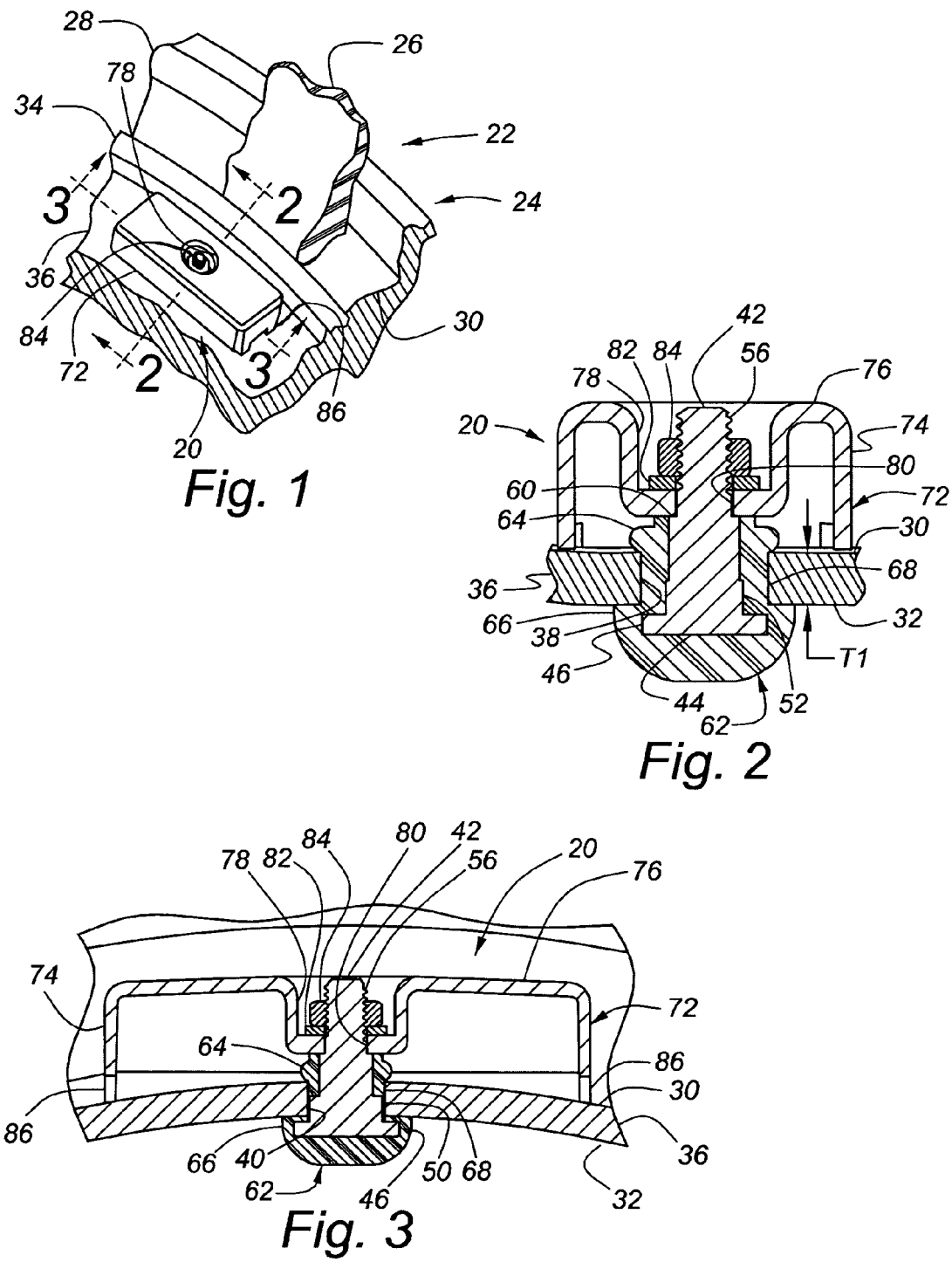

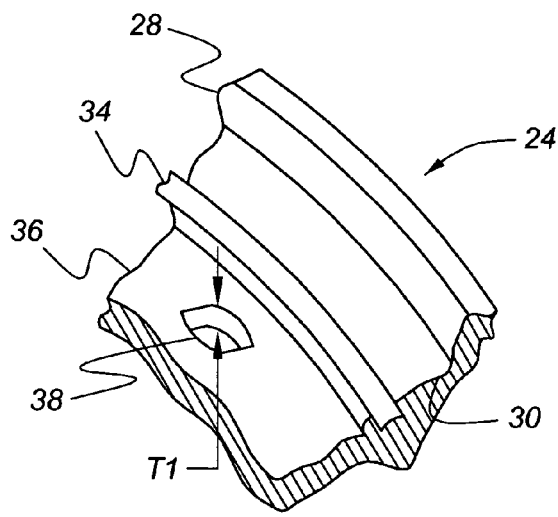
Fig. 4
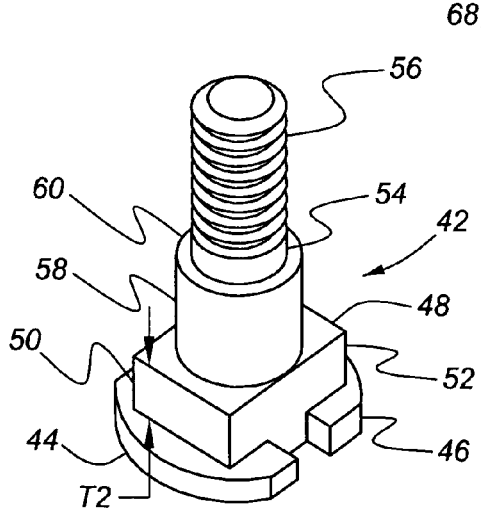
Fig. 5
Fig. 6

SEALED MOUNTING OF TIRE MONITORING ASSEMBLY

BACKGROUND OF INVENTION

The present invention relates to tire pressure monitoring assemblies and associated methods, and in particular mounting such assemblies to a vehicle wheel.

It is known in the automotive industry to provide for wireless monitoring of tire pressure—and sometimes other parameters—for pneumatic tires mounted on a vehicle. In such monitoring assemblies, sensors, as well as transmitters and power sources, such as batteries, are mounted inside each tire, typically mounted to the valve stem on the wheel. The pressure in each tire is transmitted, typically via radio frequency transmission, to a receiver located in the vehicle. A controller in communication with the receiver processes the information and then may display the tire pressure information or actuate some type of visual or audible warning device if one of the tires is beyond a certain predetermined threshold or both. Such assemblies, then, allow the vehicle operator to assure that the vehicle tires are adequately inflated while traveling down the road.

For these monitoring systems, there are circumstances when it is more desirable to mount the tire pressure monitoring systems at locations other than the valve stem. For example, one may wish to employ a common and inexpensive valve stem assembly. This avoids the creation of sealing concerns around the stem with the addition of the tire pressure sensor assembly thereto and minimizes the cost of the valve stem assembly. Also, unlike a valve stem, where regular access is required by a vehicle operator, no regular access is required for the pressure monitoring system mounted to the wheel. Thus, one may wish to have the pressure monitoring system mounted on a surface facing inwardly toward the vehicle rather than exposed on an outwardly facing surface, as is required with a conventional valve stem. This will allow the pressure monitoring assembly to remain hidden and avoid contact with objects that may damage the system.

Moreover, it is also desirable to be able to mount the pressure assemblies on various wheels without requiring a different or modified mounting system for each wheel. And, its is desirable that such assemblies are easily mounted on a wheel while assuring a good seal to prevent air leakage out of the wheel and tire assembly.

Thus, it is desirable to have a tire monitoring assembly for tires that can be readily mounted to a variety of wheels while assuring a good seal that prevents air leakage out of the wheel and tire assembly, and that may overcome other drawbacks of the prior art.

SUMMARY OF INVENTION

In its embodiments, the present invention contemplates a tire monitoring assembly for use with a wheel and tire assembly having a wheel rim, with the wheel rim including a mounting hole having an anti-rotation feature. The tire monitoring assembly may include a mounting stud having a head and a shank extending from the head, with the head including a flange portion and an anti-rotation portion adapted to operatively engage the anti-rotation feature of the wheel rim, and with the shank including a threaded end spaced from the head. A grommet is made of an elastomeric material and has an inner sealing portion, an outer sealing portion, spaced from the inner sealing portion, and a main body extending between the inner sealing portion and the outer sealing portion and adapted to be located in the mounting hole, with the outer sealing portion enclosing the flange portion. The tire monitoring assembly may also include an assembly housing including a stud hole for receiving the shank therethrough and a mount adapted for maintaining contact with the wheel rim, and a retainer for engaging a portion of the shank extending through the stud hole to thereby secure the assembly housing to the stud.

The present invention also contemplates a wheel assembly for use with a vehicle. The wheel assembly may have a wheel rim including a mounting hole having an anti-rotation feature. The wheel assembly may also have a tire monitoring assembly including a mounting stud having a head and a shank extending from the head, with the head including a flange portion and an anti-rotation portion adapted to operatively engage the anti-rotation feature of the wheel rim, and with the shank including a threaded end spaced from the head; a grommet made of an elastomeric material and having an inner sealing portion, an outer sealing portion, spaced from the inner sealing portion, and a main body extending between the inner sealing portion and the outer sealing portion and adapted to be located in the mounting hole, with the outer sealing portion enclosing the flange portion; an assembly housing including a stud hole for receiving the shank therethrough and a mount adapted for maintaining contact with the wheel rim; and a retainer for engaging a portion of the shank extending through the stud hole to thereby secure the assembly housing to the stud.

An advantage of an embodiment of the present invention is that the monitoring assembly can be simply and quickly mounted to the wheel and tire assembly while assuring a good seal. The tire pressure assembly will produce a very good seal over the entire useful life of the tire monitoring assembly. Moreover, the assembly preferably includes a positive stop feature that assures the pop-in grommet is not over-compressed, thereby assuring that the seal is not compromised during assembly.

An additional advantage of an embodiment of the present invention is that existing valve stems for air inflation can still be employed, thus minimizing the cost of valve stem assemblies. Moreover, the conventional seals employed with the existing valve stems will not be compromised by the integration of a tire pressure assemblies with the valve stems.

BRIEF DESCRIPTION OF DRAWINGS

FIG. 1 is a partial, perspective view of an inner surface of a portion of a wheel tire assembly and tire monitoring assembly, in accordance with an embodiment of the present invention.

FIG. 2 is a cross sectional view, on an enlarged scale, taken along line 2—2 in FIG. 1.

FIG. 3 is a cross sectional view, on an enlarged scale, taken along line 3—3 in FIG. 1.

FIG. 4 is a perspective view of a portion of the inner surface of the wheel rim in accordance with an embodiment of the present invention.

FIG. 5 is a perspective view of a mounting stud with a pop-in grommet molded thereon in accordance with an embodiment of the present invention.

FIG. 6 is a perspective view of the mounting stud of FIG. 5 prior to the pop-in grommet being molded thereon.

DETAILED DESCRIPTION

FIGS. 1–6 illustrate a tire monitoring assembly, indicated generally at 20, that is employed with a wheel and pneumatic tire assembly 22, including a wheel, the rim portion of which is indicated generally at 24, with a tire 26 mounted thereon in a conventional fashion. The spider (i.e., center section) of the wheel is not shown because it is conventional in nature and is affixed to or formed as part of the wheel rim, preferably in a conventional fashion.

The wheel rim 24 includes a lip 28 for supporting the bead of the tire 26 on its inner surface 30. Where the term inner surface of the wheel is used herein, this is directed to the surface that is exposed to the air pressure contained in the wheel and tire assembly 22, and where the term outer surface 32 of the wheel is used herein, this is directed to the surface that is exposed to the environment around the wheel and tire assembly 22. This outer surface 32 may have portions that face inwardly toward the wheel well and the vehicle or face outwardly away from the vehicle, such as at the location of the valve stem. The wheel rim 24 also includes a flat tire ridge 34, space from the lip 28, that is conventional in nature and helps prevent the tire bead from dropping into a center well 36 of the rim 24 if the tire loses its air pressure. The valve stem (not shown) is preferably located on the rim 24 at a location away from the tire monitoring assembly 20.

The rim 24 also includes an assembly mounting hole 38 extending from the inner surface 30 to the outer surface 32, preferably in the center well portion 36 of the rim 24. The assembly mounting hole 38 preferably includes a pair of anti-rotation flats 40. Further, the center well portion 36 of the rim 24 has a thickness T1 at the location of the assembly mounting hole 38.

The tire monitoring assembly 20 also includes a mounting stud 42. The mounting stud 42 includes a head 44 having a flange portion 46 and an adjacent anti-rotation portion 48. The anti-rotation portion 48 defines a generally rectangular base forming two pair of opposed flat surfaces. The first pair of surfaces 50 are spaced apart so that they just fit into the mounting hole 38 in the rim 24 adjacent to the corresponding anti-rotation flats 40, and the second pair 52 are spaced apart so as to leave clearance between themselves and the mounting hole 38. The anti-rotation portion 48 has a thickness T2, which is somewhat larger than half of T1, so that, when assembled, the anti-rotation portion 48 extends about half way through the thickness T1 of the wheel rim 24.

The mounting stud 42 also includes a shank 54, extending from the anti-rotation portion 48 of the head 44 and including a threaded end 56 on an opposed end from the head 44. The shank 54 includes a larger diameter portion 58 between the threaded end 56 and the head 44, with a positive stop feature 60 defined between the threads and the larger diameter portion 58.

The tire monitoring assembly 20 further includes a pop-in grommet 62, with an inner sealing portion 64 that has a larger diameter than the assembly mounting hole 38 of the rim 24, an outer sealing portion 66 that also has a larger diameter than the assembly mounting hole 38, and a smaller diameter main body 68 that extends between the inner and outer sealing portions 64, 66. The main body 68 has a length that is about the same as the thickness T1 of the wheel rim 24 and a shape about its circumference that generally matches the shape and size of the mounting hole 38 such that it will conform to the circumference of the mounting hole 38.

The pop-in grommet 62 is preferably molded onto the mounting stud 42, with the grommet 62 then completely sealing around the head 44 of the mounting stud 42 except for leaving the first pair of surfaces 50 exposed so they can mate directly with the anti-rotation flats 40. The pop-in grommet 62 is preferably made of an elastomeric material with good sealing properties. Such material may be, for example, a nitrile rubber, a flexible plastic, or any other suitable material known to those skilled in the art that is typically employed for sealing purposes.

A hollow assembly housing 72, which is part of the tire monitoring assembly 20, is defined by an outer wall 74. The outer wall 74 includes an upper surface 76 having a mounting recess 78. The mounting recess 78 includes a stud through-hole 80 for receiving the threaded end 56 of the stud 42 and is sized to receive a washer 82 and a nut 84, which mate with the threaded end 56 of the stud 42. The sides of the outer wall 74 include mounting feet 86 extending therefrom for securely mounting against the inner surface 30 of the wheel rim 24.

The nut 84 is preferably a conventional type of nut that is sized to engage the threads 56 of the mounting stud 42, as well as slide within the mounting recess 78 in alignment with the threads 56 while also being rotated therein by a conventional tool.

The hollow area within the assembly housing 72 is preferably sized to receive at least one sensor (not shown), a wireless transmitter (not shown) and a power source (not shown), all of which are known to those skilled in the art. The sensor may measure pressure, temperature, tire rotation, or some other operating parameter, and may include multiple sensors that measure different parameters. The wireless transmitter preferably transmits a radio frequency signal, although other wireless forms of transmitting data may be employed instead, if so desired. The power source may be a battery or some other conventional source of power. Since these components are known in the art, they will not be discussed further herein. Moreover, while the assembly housing 72 may also include additional internal flanges (not shown), or other means for mounting or retaining the components therein, the particular shapes and locations will depend upon the particular components employed, and are not critical to the practice of the present invention and so will not be discussed further herein.

The assembly of the tire monitoring assembly 20 to the rim 24 will now be described. During assembly, the pop-in grommet 62 is oriented so that the first pair of surfaces 50 of the mounting stud 42 will align with the anti-rotation flats 40 in the assembly mounting hole 38. Then the inner sealing portion 64 is deformed and pressed through the assembly mounting hole 38 in the wheel rim 24. The assembly housing 72, with its electrical components preferably already mounted therein, is mounted on the shank 54 of the mounting stud 42 by passing the threaded end 56 through the through-hole 80. When the assembly housing 72 is mounted on the stud 42, the mounting feet 86 are oriented to face toward the inner surface 30 of the center well 36.

The washer 82 and the nut 84 are mounted on the threaded end 56 of the stud 42 in the mounting recess 78. Torque is applied to the nut 84, preferably by a conventional tool, screwing it on until the appropriate torque value is reached. The first pair of surfaces 50 of the head 44, being located against the anti-rotation flats 40 of the mounting hole 38, will prevent the stud 42 from being rotated in the hole 38 while the torque is being applied. By having a thickness T2 of the anti-rotation portion 48 of the head 44 only slightly more than half the thickness T1 of the wheel rim 24, enough surface contact will be provided to prevent rotation of the stud 42 while still allowing the main body 68 of the grommet 62 to also engage a portion of the anti-rotation flats 40. In addition, the positive stop 60 of the shank 54 is sized to abut the outer wall 74 around the through-hole 80 in order to avoid over-compressing a pop-in grommet 62, thus preventing distortions in the grommet 62 that might compromise its sealing ability.

With this arrangement, the mounting stud 42 engages the assembly housing 72, holding the feet 86 securely against the inner surface of the rim, while also assuring that the flange portion 46 of the head 44 will hold the outer sealing portion 66 tight against the outer surface 32 of the wheel rim 24. Since the anti-rotation feature prevents the stud 42 from being rotated in the hole 38 while torque is being applied to the nut 84, no tool is required to hold the stud 42 in place. Accordingly, the grommet 62 can be molded over, thus enclosing essentially the entire head 44 of the stud 42 so that only the grommet 62 is exposed to the environment outside of the wheel and tire assembly 22. With only the grommet 62 exposed, a smooth appearance is provided. Moreover, with this over-molding, a potential leak path between the stud 42 and the grommet 62 is eliminated.

The tire monitoring assembly 20 is now rigidly and securely mounted to the rim 24 of the wheel tire assembly 22, with an airtight seal to prevent air leakage from the wheel tire assembly 22 through the mounting hole 38 in the rim 24 over the entire useful life of the tire monitoring assembly 20. The end result is an improved air seal design over that employed to seal a tire pressure monitoring system that is mounted to a valve stem (not shown). The valve stem, for providing air inflation to the wheel and tire assembly 22, is preferably a conventional pop-in valve stem mounted to the wheel in a conventional fashion. Preferably the valve stem is located away from the tire monitoring assembly 20 so the two do not interfere with each other.

While certain embodiments of the present invention have been described in detail, those familiar with the art to which this invention relates will recognize various alternative designs and embodiments for practicing the invention as defined by the following claims.

What is claimed is:

1. A tire monitoring assembly for use with a wheel and tire assembly having a wheel rim, with the wheel rim including a mounting hole having an anti-rotation feature, the tire monitoring assembly comprising:
    a mounting stud having a head and a shank extending from the head, with the head including a flange portion and an anti-rotation portion adapted to operatively engage the anti-rotation feature of the wheel rim, and with the shank including a threaded end spaced from the head;
    a grommet made of an elastomeric material and having an inner sealing portion, an outer sealing portion, spaced from the inner sealing portion, and a main body extending between the inner sealing portion and the outer sealing portion and adapted to be located in the mounting hole, with the outer sealing portion enclosing the flange portion;
    an assembly housing including a stud hole for receiving the shank therethrough and a mount adapted for maintaining contact with the wheel rim; and
    a retainer for engaging a portion of the shank extending through the stud hole to thereby secure the assembly housing to the stud.

2. The tire monitoring assembly of claim 1 wherein the anti-rotation portion of the head includes at least one mounting flat adapted to operatively engage a corresponding at least one flat on the anti-rotation feature of the mounting hole.

3. The tire monitoring assembly of claim 1 wherein the anti-rotation potion of the head includes two mounting flats on opposed surfaces of the anti-rotation portion of the head, with the two mounting flats adapted to operatively engage two flats on the anti-rotation feature of the mounting hole.

4. The tire monitoring assembly of claim 3 wherein the main body of the grommet encloses the entire anti-rotation portion of the head except for the two mounting flats.

5. The tire monitoring assembly of claim 1 wherein the anti-rotation portion of the head has a thickness that is adapted to be less than a thickness of the wheel rim at the mounting hole.

6. The tire monitoring assembly of claim 5 wherein the thickness of the anti-rotation portion of the head is adapted to be about one-half of the thickness of the wheel rim at the mounting hole.

7. The tire monitoring assembly of claim 1 wherein the shank of the mounting stud includes a positive stop that abuts the assembly housing adjacent to the stud hole.

8. The tire monitoring assembly of claim 1 wherein the assembly housing includes a mounting recess, surrounding the stud hole, that receives the retainer therein.

9. The tire monitoring assembly of claim 1 wherein the mount of the assembly housing includes a plurality of mounting feet adapted to be in contact with the wheel rim.

10. The tire monitoring assembly of claim 1 wherein the retainer is a nut that operatively engages the threaded end of the shank.

11. A wheel assembly for use with a vehicle comprising:
    a wheel having a wheel rim including a mounting hole having an anti-rotation feature; and
    a tire monitoring assembly including a mounting stud having a head and a shank extending from the head, with the head including a flange portion and an anti-rotation portion adapted to operatively engage the anti-rotation feature of the wheel rim, and with the shank including a threaded end spaced from the head; a grommet made of an elastomeric material and having an inner sealing portion, an outer sealing portion, spaced from the inner sealing portion, and a main body extending between the inner sealing portion and the outer sealing portion and adapted to be located in the mounting hole, with the outer sealing portion enclosing the flange portion; an assembly housing including a stud hole for receiving the shank therethrough and a mount adapted for maintaining contact with the wheel rim; and a retainer for engaging a portion of the shank extending through the stud hole to thereby secure the assembly housing to the stud.

12. The wheel assembly of claim 11 wherein the wheel rim includes a center well portion and the mounting hole is located in the center well portion.

13. The wheel assembly of claim 11 wherein the anti-rotation feature of the mounting hole includes at least one flat.

14. The wheel assembly of claim 13 wherein the anti-rotation portion of the head includes a least one flat in operative engagement with the at least one flat of the mounting hole.

15. The wheel assembly of claim 11 wherein the anti-rotation feature of the mounting hole includes a first pair of flats on opposed surfaces thereof and the anti-rotation portion of the head includes a second pair of flats on opposed surfaces thereof in operative engagement with the first pair of flats.

16. The wheel assembly of claim 11 wherein the shank of the mounting stud includes a positive stop that abuts the assembly housing adjacent to the stud hole.

17. The wheel assembly of claim 11 wherein the wheel rim has a first thickness at the mounting hole and the anti-rotation portion of the head has a second thickness that is less than the first thickness.

18. The wheel assembly of claim 11 wherein the mount of the assembly housing includes a plurality of mounting feet adapted to be in contact with the wheel rim.

19. A tire monitoring assembly for use with a wheel and tire assembly having a wheel rim, with the wheel rim including a mounting hole having an anti-rotation feature, the tire monitoring assembly comprising:

a mounting stud having a head and a shank extending from the head, with the head including a flange portion and an anti-rotation portion adapted to operatively engage the anti-rotation feature of the wheel rim, and with the shank including a threaded end spaced from the head and a positive stop;

a grommet made of an elastomeric material and having an inner sealing portion, an outer sealing portion, spaced from the inner sealing portion, and a main body extending between the inner sealing portion and the outer sealing portion and adapted to be located in the mounting hole, with the outer sealing portion enclosing the flange portion;

an assembly housing including a stud hole for receiving the shank therethrough, a mount adapted for maintaining contact with the wheel rim, and a mounting recess surrounding the stud hole and in engagement with the positive stop; and a retainer, located in the mounting recess, for engaging a portion of the shank extending through the stud hole to thereby secure the assembly housing to the stud.

20. The tire monitoring assembly of claim 19 wherein the anti-rotation portion of the head includes at least one mounting flat adapted to operatively engage a corresponding at least one flat on the anti-rotation feature of the mounting hole.

\* \* \* \* \*